United States Patent
Horowitz et al.

(10) Patent No.: US 7,523,770 B2
(45) Date of Patent: Apr. 28, 2009

(54) SERVICE STATION FOR SERVING REQUIREMENTS OF MULTIPLE VEHICLE TECHNOLOGIES

(75) Inventors: Alan M. Horowitz, Cherry Hill, NJ (US); Walter Weissman, Basking Ridge, NJ (US); Charles Hall Schleyer, Lincoln University, PA (US)

(73) Assignee: ExxonMobil Research And Enginnering Company, Annandale, NJ (US)

( * ) Notice: Subject to any disclaimer, the term of this patent is extended or adjusted under 35 U.S.C. 154(b) by 596 days.

(21) Appl. No.: 11/301,199

(22) Filed: Dec. 12, 2005

(65) Prior Publication Data

US 2007/0144605 A1 Jun. 28, 2007

(51) Int. Cl.
 *B65B 1/30* (2006.01)
(52) U.S. Cl. .......... 141/94; 141/104; 700/239; 340/933; 340/995.1; 340/995.19; 340/995.27
(58) Field of Classification Search .......... 141/83, 141/94, 98, 99, 100, 104, 198, 234, 302, 141/382; 700/239; 340/933, 995.1, 995.19, 340/995.27
See application file for complete search history.

(56) References Cited

U.S. PATENT DOCUMENTS

| | | | |
|---|---|---|---|
| 2,977,970 A | 4/1961 | Young | |
| 4,012,315 A | 3/1977 | Heilweil | 208/253 |
| 5,029,100 A | 7/1991 | Young et al. | 700/239 |
| 5,257,720 A | 11/1993 | Wulc et al. | 222/20 |
| 5,400,253 A | 3/1995 | O'Connor | 364/442 |
| 5,422,624 A | 6/1995 | Smith | |
| 5,523,666 A * | 6/1996 | Hoelzl et al. | 320/109 |
| 5,548,200 A | 8/1996 | Nor et al. | 320/27 |
| 5,563,707 A | 10/1996 | Prass et al. | 356/361 |
| 5,605,182 A | 2/1997 | Oberrecht et al. | |
| 5,833,390 A | 11/1998 | Lovett | 405/52 |
| 5,913,180 A | 6/1999 | Ryan | 702/45 |
| 5,921,263 A | 7/1999 | Negley, III | 137/3 |
| 5,956,254 A | 9/1999 | Collins | 364/479.09 |
| 5,979,705 A | 11/1999 | Kaehler et al. | 222/71 |
| 6,006,775 A * | 12/1999 | Negley, III | 137/93 |
| 6,032,703 A | 3/2000 | Baker et al. | 141/94 |

(Continued)

FOREIGN PATENT DOCUMENTS

EP 0 943 584 A1 9/1999

(Continued)

*Primary Examiner*—Timothy L Maust
*Assistant Examiner*—Jason K Niesz
(74) *Attorney, Agent, or Firm*—Kenneth Watov; Watov & Kipnes, P.C.

(57) ABSTRACT

A service station is provided with a plurality of vehicle servicing islands including liquid fuel blending pumps for dispensing and blending fuel components from underground storage tanks for refueling standard gasoline engine driven vehicles, standard diesel engine vehicles, vehicles with engines requiring dual fuels, vehicles with HCCL engines require low octane gasoline blended with standard diesel fuel, and fuel cell powered vehicles having onboard reformers. Other service islands include pumps for dispensing compressed hydrogen to fuel cell powered vehicles that do not include onboard reformers. In addition, service islands are provided for recharging the batteries of pure electric powered vehicles. A service station is further provided with a wireless communicator for receiving signals indicative of a vehicle's fuel requirements and transmitting signals to direct the vehicle to a service island capable of servicing the vehicle.

20 Claims, 6 Drawing Sheets

U.S. PATENT DOCUMENTS

| | | | |
|---|---|---|---|
| 6,068,030 A | 5/2000 | Tatsuno | 141/94 |
| 6,070,156 A | 5/2000 | Hartsell, Jr. | 705/413 |
| 6,085,805 A | 7/2000 | Bates | 141/94 |
| 6,116,298 A | 9/2000 | Haimovich et al. | 141/94 |
| 6,129,835 A | 10/2000 | Lesieur et al. | 208/208 R |
| 6,163,738 A | 12/2000 | Miller | 700/239 |
| 6,191,695 B1 | 2/2001 | Tatsuno | 340/600 |
| 6,250,347 B1 | 6/2001 | Tatsuno | 141/198 |
| 6,276,310 B1 | 8/2001 | Backes et al. | 123/1 A |
| 6,363,299 B1 | 3/2002 | Hartsell, Jr. | 700/244 |
| 6,422,465 B2 | 7/2002 | Miller | 235/384 |
| 6,531,103 B1 | 3/2003 | Hakka et al. | 423/242.2 |
| 6,716,336 B2 * | 4/2004 | Hurland et al. | 205/786.5 |
| 6,810,925 B2 | 11/2004 | Graham et al. | 141/98 |
| 7,171,989 B2 * | 2/2007 | Corless et al. | 141/2 |
| 7,287,558 B2 * | 10/2007 | Hobbs | 141/97 |
| 2002/0100801 A1 | 8/2002 | Na-Ranong | 235/381 |
| 2002/0104781 A1 | 8/2002 | Lesieur et al. | |
| 2002/0152037 A1 | 10/2002 | Sunshine et al. | 702/23 |
| 2003/0205287 A1 * | 11/2003 | Sobota et al. | 141/59 |
| 2005/0031506 A1 * | 2/2005 | Huang et al. | 422/211 |

FOREIGN PATENT DOCUMENTS

| | | |
|---|---|---|
| GB | 2342393 A | 4/2000 |
| JP | 08207999 A | 8/1996 |
| JP | 2001348100 A | 12/2001 |
| WO | WO 98/00817 | 1/1998 |
| WO | WO 02/09061 A2 | 1/2002 |
| WO | WO 02/070109 A1 | 9/2002 |
| WO | WO 2004/040672 A2 | 5/2004 |

* cited by examiner

SERVICE STATION FOR SERVING REQUIREMENTS OF MULTIPLE VEHICLE TECHNOLOGIES

FIELD OF THE INVENTION

The present invention relates generally to vehicle service stations, and more particularly to service stations for serving the needs of vehicles that are powered by different technologies.

BACKGROUND OF THE INVENTION

Present automotive and commercial vehicle service stations typically include refueling islands that include pumps for selectively dispensing regular, or mid-grade, or super-grade unleaded gasoline to gasoline driven vehicles. Such pumps are typically fuel blending pumps for pumping and blending as necessary different grades of octane levels of gasoline from three underground tanks, respectively, blending being indicated by the grade of the gasoline to be dispensed. Also, some present service stations also include diesel dispensing islands that are separate from and independent of the gasoline dispensing island or islands at the station. A limited number of present service stations, such as those of ExxonMobil Company provide limited remote communication between a passive RFID card carried by the driver, who waves the card at an associated pump. The pump includes a detection system for reading information from the card, such as the user's name, credit account number, and so forth, for activating the pump with fuel to be dispensed to the associated vehicle, and the user's account to be debited for the cost of the fuel dispensed.

Government mandated future vehicle emission and fuel consumption regulations, have caused companies associated with the supply of vehicle fuels, and with the development and supply of engines for powering vehicles, to greatly increase expenditures for the research and development of new engines, improved fuels, and other vehicle technologies. These developments are leading to improved new turbo charged high compression ratio gasoline engine, dual-fueled vehicles, homogenous charge compression ignition (HCCI) engines, hydrocarbon fuel-electric hybrid vehicles, vehicles powered by fuel cells, and improved electric vehicles. Excluding pure electric vehicles, new engine technologies are leading to the development of fuel formulations that may be significantly different than those currently being provided. As a result, present service stations will be required in the near future to implement new modified fuel dispensers for dispensing the additional types of fuel that will be required by vehicles incorporating the new technologies now in development. It is also expected that fuel quality parameters will have to be more tightly controlled in order to meet vehicle emission requirements. Accordingly, there is an immediate need in the art to develop, as economically as possible, expanded and/or modified present services stations that will be capable of providing cost-effective delivery of new fuel requirements, while at the same time facilitating a consumer's ability to refuel or recharge their future vehicle in an efficient manner.

SUMMARY OF THE INVENTION

An object of the invention is to provide a service station capable of providing the refueling or recharging requirements of vehicles incorporating technologies presently being developed.

Another object of the invention is to provide a service station including fuel dispensing systems that incorporate fuel parameter sensors for sensing the fuel requirements of a vehicle to be serviced, and for including shut-off valves that will only be deactivated for dispensing fuel upon the dispensing system sensing and configuring itself for delivering the fuel required by a given vehicle, to prevent fueling errors.

Yet another object of the invention is to provide a service station with a telecommunication or radio communication system to communicate with a supply terminal for insuring the required inventory for multiple types of fuels.

Another object of the invention is to provide remote communication between a vehicle user and a fuel or recharge dispenser system for insuring that the vehicle is dispensed its required fuel, in addition to debiting the user's account for the charges associated with the fuel dispensed.

Another object of the invention is to provide a service station with a communication system capable of remotely or wirelessly communicating via the associated dispenser system with a convenience or C-Store associated with the service station, to permit the vehicle user to order food, drinks, or other convenience items while attending to refueling their vehicle, or recharging their vehicle if an electric vehicle.

These and other objects of the invention are provided by a service station including islands with fuel dispensing pumps capable of delivering five different fuels from three underground storage tanks containing different base fuels that are blended by the fuel pump system. Other blending pumps are provided for dispensing up to six different fuel formulations by blending different base fuels from four underground storage tanks, respectively. The service station also includes at least one island for dispensing compressed hydrogen fuel to hydrogen fueled vehicles. Another island includes an electric charging station for electrically recharging pure electric vehicles. A convenience store is also included at the service station. The vehicle or user of the vehicle is equipped with means for remotely communicating with the dispenser system for insuring that the fuel required by that vehicle is delivered to the vehicle by the associated blending pump, while at the same time insuring that a fuel valve in the fuel dispensing line remains closed when the proper fuel cannot be delivered. Also, the communication means of the service station located on the fueling islands or recharge islands are provided with means for communicating with the driver of a vehicle at the island, for permitting the driver to remotely communicate an order for items from a convenience store located at the service station. The communications system between the vehicle driver and an associated blending pump system will also include means for communicating driving conditions to the driver, maintenance timing for the vehicle, inspection information for the vehicle, suggested oil change scheduling, and suggested convenience or C-Store favorites that are presently available. Any other desired information to be communicated between the vehicle, or vehicle occupants, and the remote communication system(s) of the service station may be included. An electronic sensing system is provided for preventing operation of the blending pump, or terminating its operation, if the fuel required by the vehicle at a given time cannot be dispensed. Sulfur sensor means are included for monitoring the sulfur content of fuel being delivered from a tank truck to underground storage tanks, for preventing further delivery of the fuel from the truck if the sulfur content exceeds a predetermined level. Other sulfur sensors are included at the blending pumps for monitoring the sulfur content of fuel being delivered to a vehicle, to insure that it is within an acceptable range, and if not, for terminating the operation of the dispenser.

BRIEF DESCRIPTION OF THE INVENTION

Various embodiments of the present invention are described with reference to the drawings in which like items are identified by the same reference designation, wherein.

DETAILED DESCRIPTION OF THE INVENTION

A main objective of the various embodiments of the invention is to provide a service station that will meet the requirements for refueling or recharging of vehicles that are driven by gasoline, diesel, and hybrid engines of present technology, and future vehicles that are expected to be driven or powered by engines or motors requiring fuels and/or electric charging unlike the requirement of present vehicles. There is recognition today by both automotive manufactures and energy companies that vehicle efficiency should be improved. There is further recognition that the present gasoline-powered vehicles are capable of converting only about twenty percent (20%) of the thermo-energy content of gasoline into mechanical work. Recently, hybrid vehicles have been developed that are powered by both electric motors and small diesel or gasoline engines, and are drawing increasing sales in the US as gasoline prices increase. Hybrid vehicles can provide up to a fifty percent (50%) improvement in fuel economy when compared to a like-sized gasoline powered vehicle, resulting into about a thirty percent (30%) efficiency for converting the thermo-energy content of gasoline utilized into mechanical work. It is expected that such vehicles will continue to be made in increasing numbers, and will require the standard grades of gasoline presently being sold at various service stations. Battery powered electric cars have also been developed, and are being sold in relatively small numbers when compared to vehicles powered by internal combustion engines, or even the new hybrid systems. Pure electric vehicles have limited range before their batteries require charging. Typically, electric vehicles have a range of from 50 to 130 miles between charges. However, it is possible that with ongoing research for improving the batteries available for such a vehicle, that the range will be increased in the future, producing much greater sales of such vehicles.

The present inventors have also recognized that fuel cell powered electric cars now under development, may enter the marketplace in ever increasing numbers over the next 20 years. Such vehicles include in actual practice a stack of individual fuel cells electrically connected together to provide sufficient DC (direct current) voltage for powering an electric motor to drive the associated vehicle. Fuel cells are powered by hydrogen and oxygen, which via the electrochemical action that takes place in a fuel cell, free electrons are generated for providing the electrical power, and typically the exhaust product is water vapor. Accordingly, fuel cell driven vehicles do not produce any local pollution products. Because the inventors recognize that future service stations must have the ability to provide hydrogen fuel to such future fuel cell powered electric cars. The inventors also recognize that such vehicles may include what is known in present technology as a reformer, whereby they must be refueled by a predetermined blend of gasoline, for example, of very low sulfur content, which is converted by the reformer stored in the vehicle to hydrogen for use in the fuel cell stack. The present inventors recognize that fuel cell powered cars may include fuel reformers to produce hydrogen or may require direct hydrogen fueling. Accordingly, the present inventors provide for one embodiment of the invention a service station that includes a hydrogen fueling island, as will be discussed further.

The present inventors also recognize that pure electric vehicles will likely require a service station to provide rapid electric recharging of the batteries of such vehicles. Accordingly, one embodiment of the invention provides for a service station to also include an island for recharging the batteries of an electric vehicle.

The present inventors further recognize that ongoing research is being conducted for improving fossil fueled vehicles. One type of internal combustion engine being developed is known as a "homogenous charge compression ignition (HCCI) engine, that has been proven to provide high thermo efficiency along with low $NO_X$ and particulate matter emissions. In HCCI engines, the fuel mixture is premixed when it enters the piston chamber similar to spark ignition engines, but does not utilize a spark plug for igniting the mixture, and instead utilizes compression ignition similar to diesel engines, thereby reducing throttling losses and providing high efficiency operation. Also, HCCI engines can be sized for meeting many different applications. Present research is concentrating on controlling HCCI combustion, which is a present obstacle for widespread commercialization or use of such engines. However, the present inventors believe that HCCI engines may reach the marketplace and enjoy common usage in future years. The inventors recognize that such engines will require a different blend of fuel than presently offered at typical service stations.

As a result of their investigation into the expected systems for powering present and future vehicles, the present inventors have recognized and conceived a design for future service stations that will be capable of servicing vehicles powered by a myriad number of different systems in the future. Also, the various embodiments of the invention as described in detail below have been developed by the present inventors for permitting the modification of present service stations with minimal cost. In other words, the various embodiments of the invention take into account the underground storage capability of typical present service station, and to the greatest extent possible utilize such underground storage without requiring extensive modification thereof.

Figure 1:
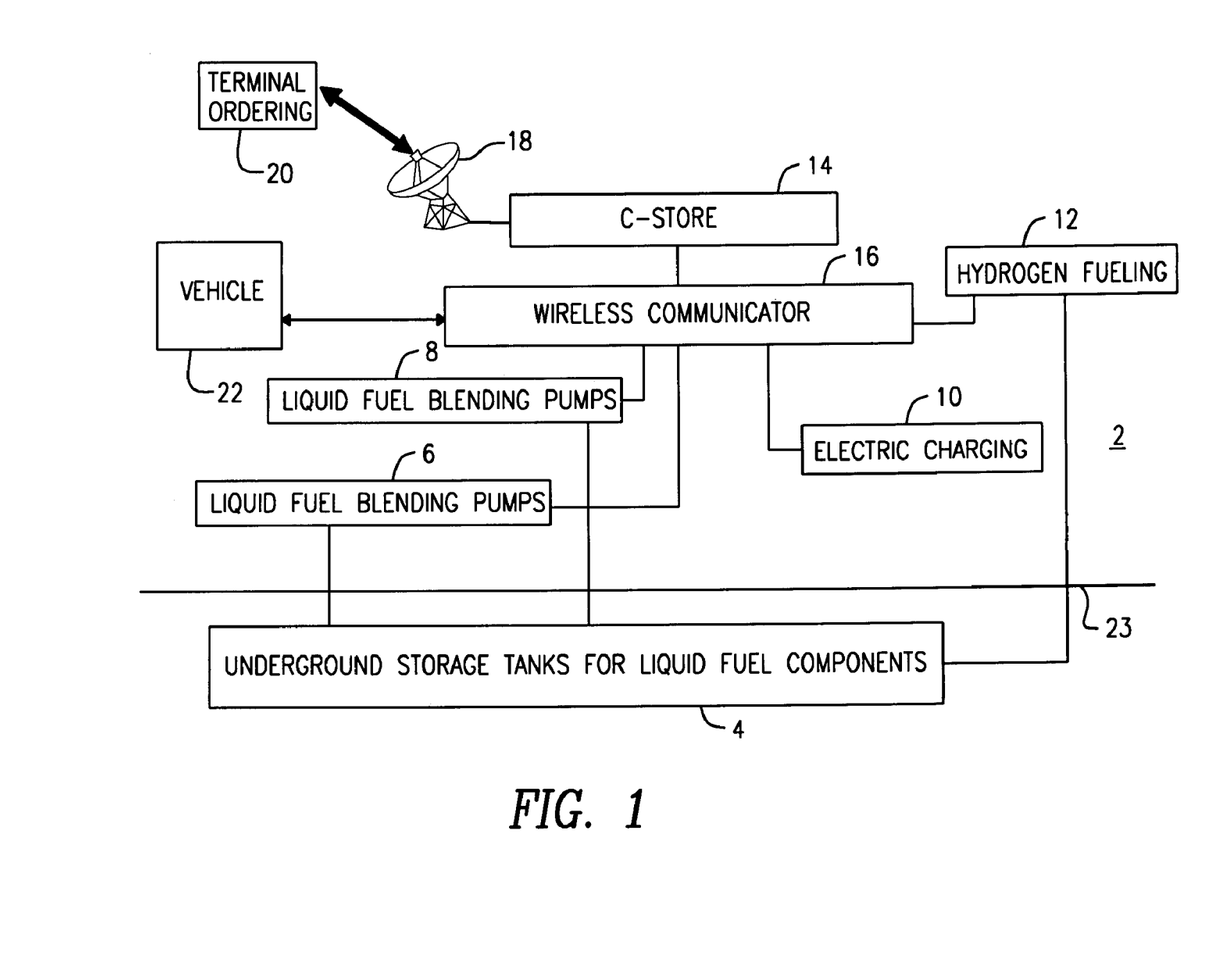
FIG. 1 is a block diagram of a service station for one embodiment of the invention.

With reference to FIG. 1, the future service station layout for one embodiment of the invention is generally shown in block schematic diagram. The service station 2 includes underground storage tanks 4 for containing liquid fuel components for supply to liquid fuel blending pumps 6, 8, in this example, which are located at one or more refueling islands of a station 2. An electric charging island 10 is provided for recharging pure electric vehicles. Also, a hydrogen fuel island 12 is provided for refueling hydrogen drive or fuel-cell vehicles that do not include a reformer, as previously mentioned. Station 2 also includes a convenience store 14 (C-Store) for providing motorists with food snacks, and other various necessities. A vehicle/station wireless communicator 16 is included for providing bidirectional communication between vehicles entering the station, the convenience or C-Store 14, and the liquid fuel blending pumps 6, 8, electric charging island 10, and hydrogen fueling island 12. Also, the station 2 further includes a radio communication system 18 for communicating with a remotely located terminal ordering facility, for resupplying the station 2 with various items required for the station. For example, it is expected that a computerized ordering system will be utilized, whereby if certain liquid fuel components of the underground storage tanks 4 reach a minimum level, or tanks (not shown) containing liquid fuel for the blending pumps 6, 8, or for the hydrogen fueling island 12, require refilling, ordering therefore will be automated. In this example, C-Store 14 includes the computerized re-ordering system, and the necessary connection to the radio computerized system 18 for reordering supplies from the terminal ordering center 20, for this example.

The vehicle/station wireless communicator 16 is included for providing bidirectional communication between the fuel blending pumps 6, 8, hydrogen fueling island 12, electric charging island 10, C-Store 14, and vehicles entering the station 2, as will be described in greater detail below. Note that the vehicle/station wireless communicator 16 can be provided by either a radio communication system, infrared communication system, or any other wireless system capable of providing the necessary communication between the vehicle, and the various operating systems of the station 2, including the C-Store 14. Also, it is expected that either a centralized vehicle/station wireless communicator 16 will be utilized, or each of the liquid fuel blending pumps 6, 8 the hydrogen fueling island 12, and the electric charging island 10 will have a dedicated communicator associated therewith, for providing the necessary communication. Also, vehicle 22 is assumed to include an appropriate wireless communication system for bidirectional communication with the wireless communicator 16, as shown.

Figure 2:
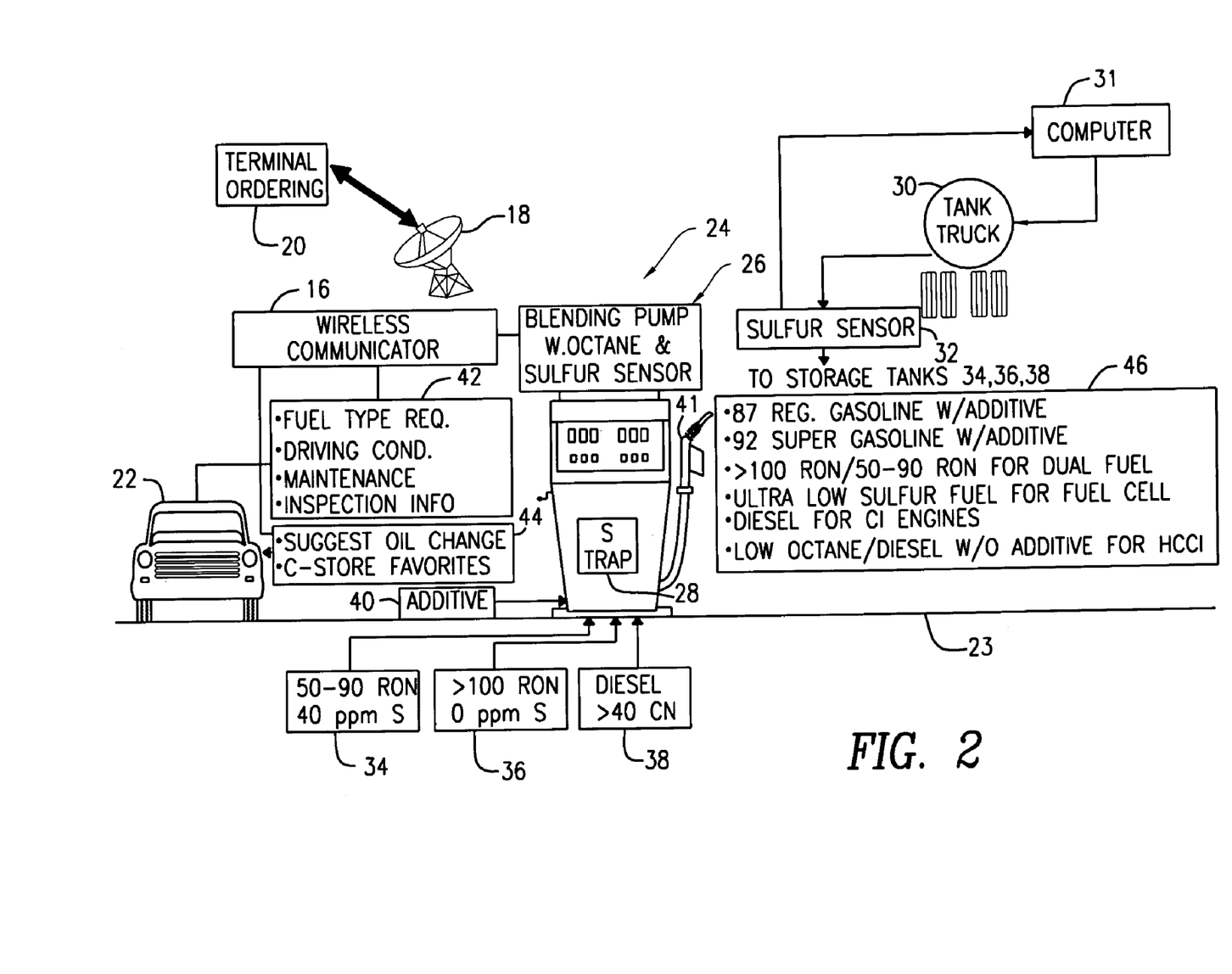
FIG. 2 is a block diagram of a liquid fuel blending delivery area or island for an embodiment of the invention.

In FIG. 2, a liquid fuel blending delivery area or a portion of a fueling island 24 is shown. In this example, a blending pump 26 includes octane and sulfur sensors, and a sulfur or "S Trap" 28. Note that when delivering fuel to the various underground storage tanks 4, a tank truck 30 delivers the fuel through a sulfur sensor 32 for insuring that fuel of less than a specific maximum sulfur content is delivered to an appropriate tank, by terminating fuel delivery if the sulfur content exceeds the maximum sulfur content level. In this example, the storage tanks 4 include three individual tanks 34, 36, and 38. In addition, an aboveground Additive Tank 40 is included. As shown, all of the individual tanks 34, 36, 38, and 40 are directly connected to the blending pump 26. A wireless communicator 16, which as previously mentioned can be a centrally located communicator 16 or a plurality of communicators 16 dedicated to each of the blending pumps or fueling or charging stations of the service station 2, respectively. In this example, upon entering the station 2, the operator of the vehicle 22 can press a button for submitting information as shown in block 42 to the wireless communicator 16, the information including the type of fuel required by the vehicle 22, the driving condition of the vehicle, the maintenance record of the vehicle, and inspection information for the vehicle 22. In turn, the wireless communicator may respond by transmitting back to the communicator (not shown) of vehicle 22 maintenance suggestions such as an oil change that is now due, and also may transmit convenience store 14 favorites or specials of the day. The wireless communicator of vehicle 22 is preferably operable to receive a sianal from wireless communicator 16 indicative of the service island the vehicle must go to for servicing, whereby a visual display and/or oral message is presented to the vehicle operator to identify the service island location. The bidirectional information illustrated herein is not meant to be limiting, and other information may be transmitted from vehicle 22 to the wireless communicator 16, or from the latter to the vehicle 22. Also, in this example, tank 34 may include fuel having a 50 to 90 RON (Research Octane Number) with 40 ppm (Parts Per Million) of sulfur (S). Tank 36 may include fuel of greater than 100RON , and having 0 ppm S. Tank 38 may include diesel fuel of greater than 40 CN (Cetane Number). and other information may be transmitted from vehicle 22 to the wireless communicator 16, or from the latter to the vehicle 22. Also, in this example, tank 34 may include fuel having a 50 to 90 RON (Research Octane Number) with 40 ppm (Parts Per Million) of sulfur (S). Tank 36 may include fuel of greater than 100 RON, and having 0 ppm S. Tank 38 may include diesel fuel of greater than 40 CN (Cetane Number).

As further shown in FIG. 2, for use of the fuels illustrated as being loaded into tanks 34, 36, and 38, respectively, the blending pump 26 can be operated to deliver from its nozzle 41 87 RON regular gasoline with required additive for vehicle 22 from Additive Tank 40, or a blend for providing 92 RON from a blend of the fuel in tanks 34 and 36 along with additive from tank 40 for a super grade of gasoline; or greater than 100 RON/50-90 RON for providing a required dual fuel from tanks 34 and 36; or an ultra-low sulfur fuel from tank 36 for delivery to a vehicle 22 powered by a fuel cell supplied hydrogen from a reformer; or diesel fuel of greater than 40 CN from tank 38 for a vehicle 22 powered by a compression ignition engine; or low octane/diesel fuel from tank 38 without additive for vehicles powered by a homogenous charged compression ignition (HCCI) motor driven vehicle 22; all as shown in block 46, for example. Depending upon the design of the blending pump 26, many other blends of fuel from tanks 34, 36, 38, and 40 can be delivered.

Figure 3:
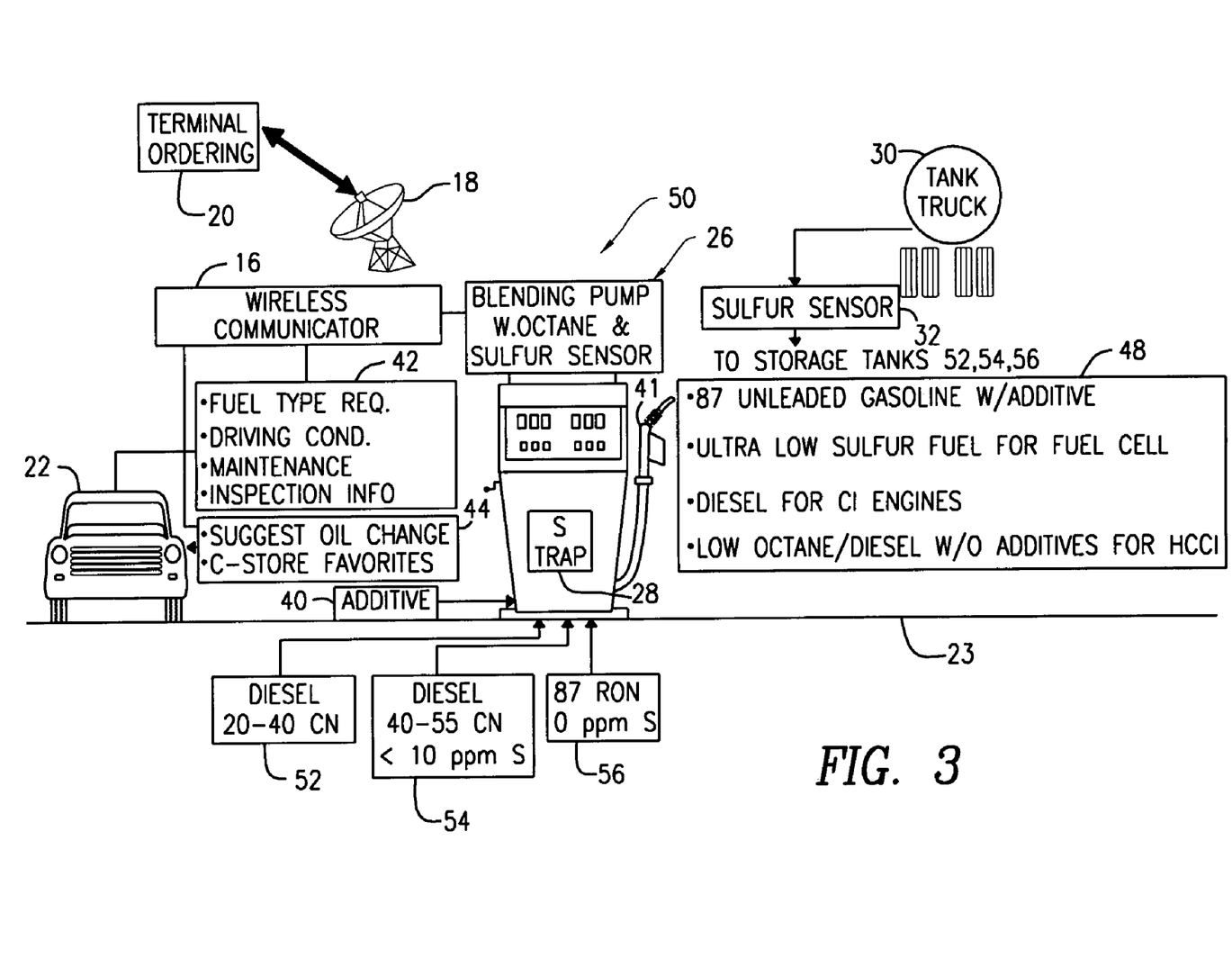
FIG. 3 is a block diagram of a liquid fuel blending delivery area or island for another embodiment of the invention.

In FIG. 3, a liquid fuel blending delivery area or island 50 includes substantially the same blending pump system 26 as in FIG. 2, the difference being that blending pump 26 is connected to storage tanks 4 containing different fuels than those associated with blending island 24. More specifically, blending pump 26 is connected to a tank 52 containing diesel fuel of 20 to 40 CN; a second tank 54 containing diesel fuel ranging from 40 to 55 CN, and having less than 10 ppm of sulfur; and a tank 56 containing unleaded gasoline of 87 RON that is free of sulfur. As shown in box 48, through use of the aforesaid fuels, the blending pump 26 can be operated to, for example, to deliver 87 RON unleaded gasoline with additive from tanks 40 and 56; or ultra low sulfur fuel from tank 56 for a vehicle 22 powered by a fuel cell; or diesel fuel from tank 52 for delivery to a vehicle 22 powered by a standard diesel or CI engine; or a low octane/diesel fuel from tank 54 without additive for use by a vehicle 22 powered by an HCCI engine.

Figure 4:
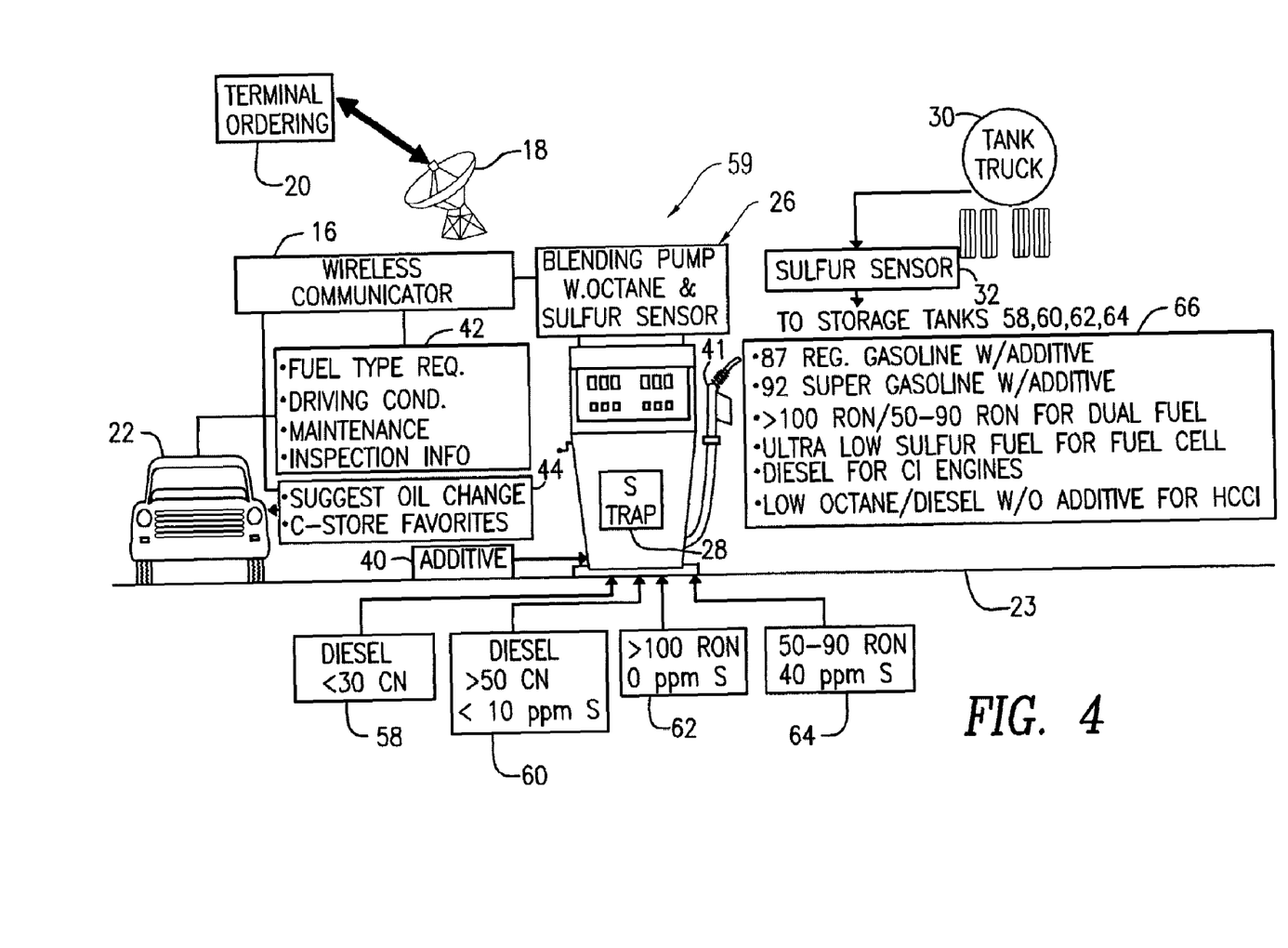
FIG. 4 is a block diagram of a liquid fuel blending delivery area or island for another embodiment of the invention.

In FIG. 4, another example of a liquid fuel blending delivery area or island 59 is shown for another embodiment of the invention. In this example, four fuel storage tanks 58, 60, 62, and 64 are utilized, as shown. The tank 58 includes diesel fuel of less than 30 CN. Tank 60 includes diesel fuel of greater than 50 CN, but having less than 10 ppm of sulfur. Tank 62 includes gasoline of greater than 100 RON, and is free of sulfur. Tank 64 includes a fuel or gasoline having an octane rating ranging from 50 to 90 RON with 40 ppm of sulfur. With this combination of available fuels, the blending pump 26 can be operated for dispensing from its nozzle 42 blended or unblended fuels as shown in block 66, for example. More specifically, 87 regular octane gasoline with an additive from tanks 40 and 64; or 92 RON super or premium gasoline with additive from a blend of fuel from tanks 62, 64, and 40, respectively; or a dual fuel of a blend of greater than 100 RON gasoline from tank 62 with less than 80 RON gasoline from tank 64; or ultra low sulfur fuel from tank 62 for delivery to a fuel cell powered vehicle 22 including a reformer; or greater than 50 CN diesel fuel from tank 58 for compression ignition engines driving vehicle 22; or low octane diesel fuel from tank 58 with additive from tank 40 for refueling a vehicle 22 driven by an HCCI engine.

Figure 5:
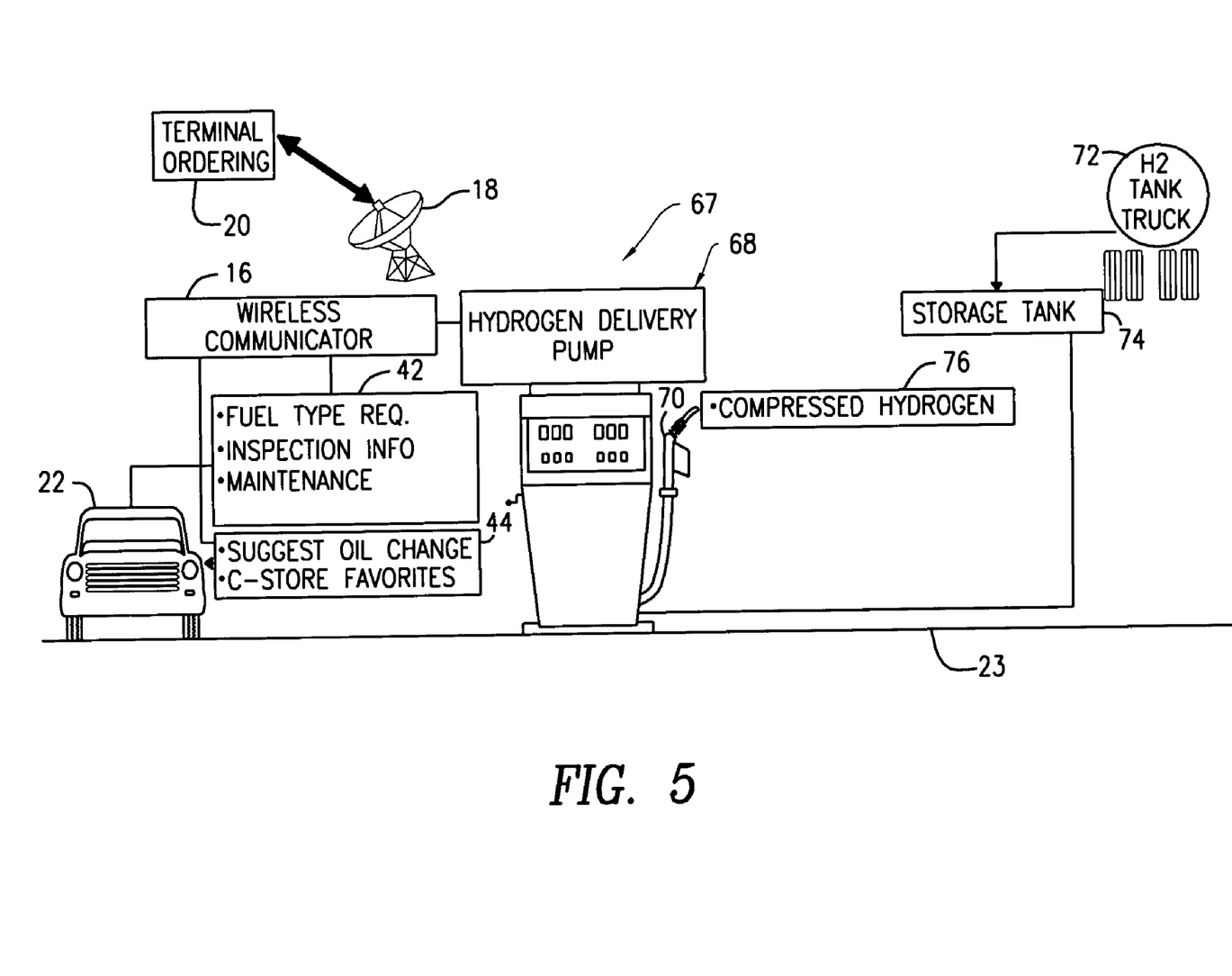
FIG. 5 is a block diagram of a compressed hydrogen fuel delivery area or island for an embodiment of the invention.

In FIG. 5, an example of a compressed hydrogen fuel delivery area or island 67 is shown that includes a hydrogen delivery pump mechanism 68 having a nozzle 70 for dispensing compressed hydrogen 76. Hydrogen, for example compressed hydrogen, is delivered from a tank truck 72 to a storage tank 74. The hydrogen delivery pump 68 extracts hydrogen from the storage tank 74 and delivers the same via a nozzle 70 to a compressed hydrogen tank 76 that is installed within a hydrogen fueled vehicle 22. As previously described, such a hydrogen fueled vehicle 22 is driven by an electric motor that is powered by electricity derived from a fuel cell onboard the vehicle 22 that does not include a reformer.

Figure 6:
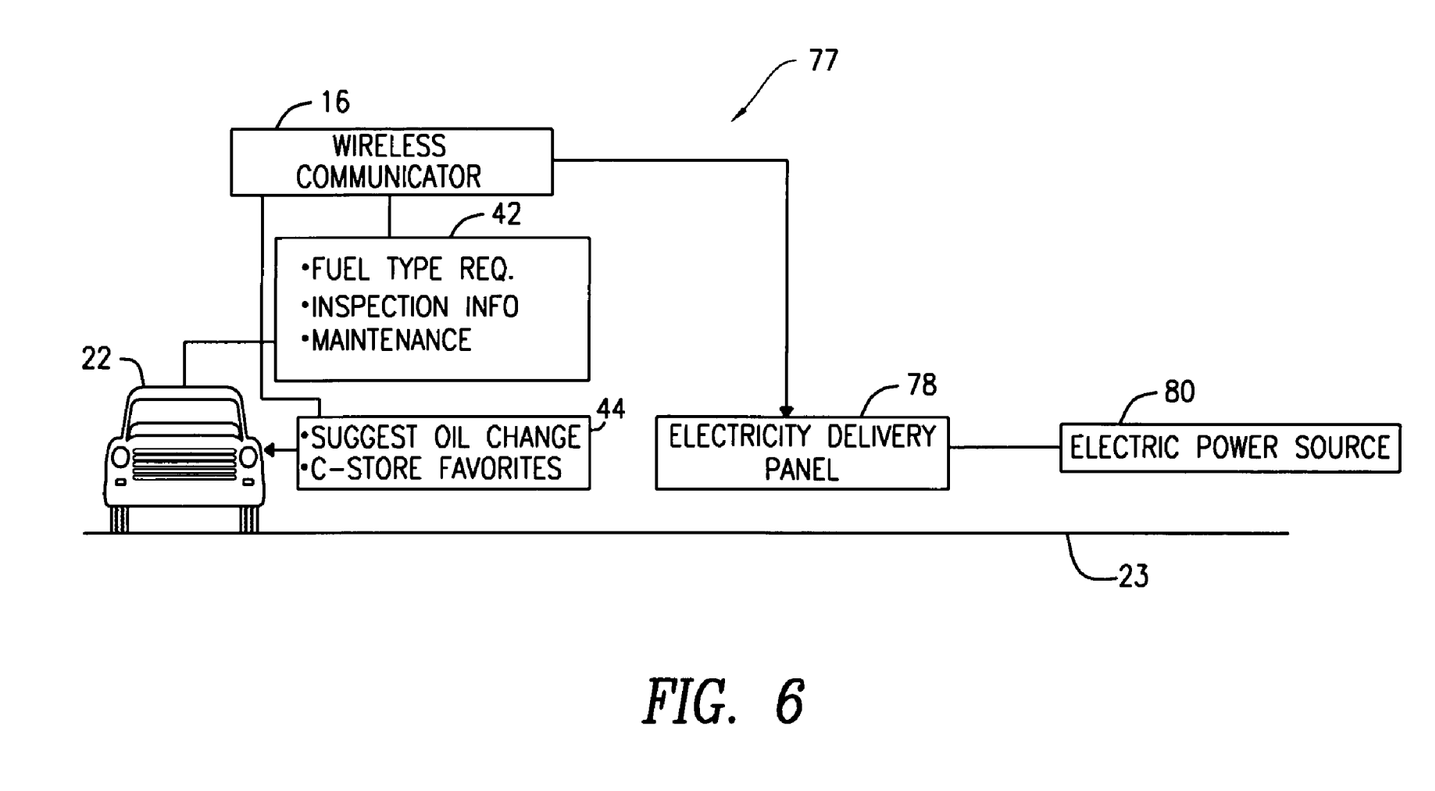
FIG. 6 is a block diagram of an electric vehicle charging area island for yet another embodiment of the invention.

In FIG. 6, for another embodiment of the invention, an electric vehicle charging area or island 77 is shown. The electric vehicle charging island 77 includes an electricity delivery panel or charging system 78 driven by electric power source 80, for recharging the batteries (not shown) in a vehicle 22 drive by electric motors powered from rechargeable storage batteries (not shown).

In another embodiment of the invention, a computer 31 (see FIG. 2) is included in the delivery tank truck 30 for delivering liquid fuels. The computer 31 is programmed to turn off shut-off valves in truck 30 for interrupting the flow of fuel to an underground storage tank if the detected sulfur level is higher than a predetermined safe level. Underground storage tanks 4 of the various embodiments of the invention are independently piped to the dispensing pumps 26. Also, shut-off valves (not shown) are included at the fuel blending islands 24, 50, and 58 FIGS. 2, 3, and 4, respectively, which are not operated to their open condition unless a designated fuel or blend of fuel is available from the associated blending pump 26 for delivery to a vehicle 22. On site computer systems (not shown) also include any necessary hardware and software for operating pumps 26, and 68 to provide required fuels to be delivered to the vehicles 22.

As previously mentioned, other hardware/software (not shown) is included in the system to permit wireless communication between a consumer and a given dispenser 26, 68, or charging system 78, and/or the C-Store 14.

Note that existing technology is expected to be utilized for the hydrogen fuel delivery area or island 67. Also, existing technology is expected to be used for the battery recharging island 77.

Further operation of the inventive Future Service Station 2 will now be described. Typically, a consumer upon driving his/her vehicle into the service station 2 is directed by signage to an appropriate fueling location. Gasoline powered, diesel powered, HCCI powered, hybrid engine powered, and some fuel cell powered vehicles 22 will be directed to the fueling islands 24, 50, or 58. Also powered vehicles 22 that require compressed hydrogen fuel are directed to a hydrogen fueling island 67. Lastly, electric powered vehicles are directed to a battery recharging island 77.

In this example, upon arriving at a given refueling island, a vehicle 22 will automatically communicate via its onboard wireless communication system with the wireless communicator 16 associated with a given one of the aforesaid islands. Information from a vehicle 22 typically will provide fuel type properties required for the vehicle 22 (e.g., gasoline, diesel, HCCI, hydrogen, or electricity, along with required liquid fuel octane levels, sulfur levels, and additive requirements). Vehicle 22 will also communicate its maintenance history (e.g., mileage at the last oil change, condition of oil, and so forth), and inspection information as to when the vehicle 22 is next due for inspection.

The wireless communicator 16 associated with a given dispenser 26, 68 is next made operative to communicate to the consumer via a visual display (not shown) located on the associated fuel pump 26, 68 or communicate directly to the vehicle for displaying on an onboard display system of the vehicle (not shown) a suggestion that the consumer set up an appointment for a needed oil change, vehicle inspection, or other maintenance requirement, if appropriate. Also the convenience or C-Store 14 will communicate or send advertisements to a vehicle 22. Wireless communicator 16 will also inquire whether the associated consumer expects to do any abnormally severe driving, such as pulling a trailer up a hill for a 100 miles, or traveling extremely long distances. Also, the consumer will be prompted by the wireless communicator 16 to indicate the amount of fuel that is to be purchased for the vehicle.

In this embodiment of the invention, examples of actions required for the consumer to perform will be to request a specific amount of fuel, schedule vehicle maintenance or inspection, convey any expected abnormal driving conditions to the wireless communicator 16, select upgraded fuel additive to improve vehicle performance (if appropriate), and order food or other items from the C-Store 14.

Upon receiving the replies from the consumer, the wireless communicator 16 will then program the associated dispenser 26, 68 for providing the required fuel based on the vehicle requirements and expected driving conditions. If necessary, the required fuel is internally blended via the associated dispenser 26 through use of the fuels available from the underground storage tanks 4, while at the same time adding any required additives from the associated Additive Tank 40. A hydrogen fueling dispenser 68 will be programmed to dispense compressed hydrogen from an aboveground storage tank 74, if the required fuel is hydrogen for fuel cell powered vehicles 22. Similarly, if the vehicle 22 is a pure electric vehicle, the electric vehicle recharging island 77 will be programmed for recharging the vehicle's batteries (not shown) via an electric cable having an appropriate connector for attachment to the battery system of the vehicle 22. For liquid fuel vehicles, key fuel quality parameters, such as sulfur content, are checked by the system before delivering the fuel to a vehicle 22. Where appropriate, filters, traps, and so forth are included in the present inventive system for removing trace levels of various contaminants, such as sulfur. Depending upon the local regulations, either a consumer or a station attendant will be instructed to dispense the desired amount of fuel to the vehicle 22. Shutoff valves will be turned off immediately if the quality of fuel is determined to not be consistent with the requirements of the particular vehicle 22 being refueled.

While waiting for refueling or recharging, a consumer can wirelessly place orders for food, and other necessities, from the convenience store 14. The consumer can also use his/her vehicle communicator to contact the associated wireless communicator 16 to schedule an appointment for vehicle maintenance or inspection. The computerized system of the Future Service Station 2 is also programmed for charging all purchases to a consumer's SpeedPass or credit card. As previously mentioned, the inventive Future Service Station 2 will also have its hardware and computerized system programmed for monitoring the level of fuel at any given time in the underground storage tanks 4, in the Additive Tank 40, and in the compressed hydrogen storage tank 74, for communicating via a wireless communication system 18 with a terminal ordering center 20 for having fuel delivered to the station 2 as required for refueling the aforesaid underground and aboveground tanks. For use of such a communication means, the Future Service Station 2 will minimize run outs of fuel. In addition, monitoring will minimize product contamination from product mixing.

Lastly, also as previously mentioned above, a liquid fuel tank truck 30 for delivering fuel to the service station 2 will include a product quality sensor to monitor key parameters, such as a sulfur sensor 32, as previously indicated. The tank truck 30 will include valves for terminating fuel delivery if for example the sulfur dispenser 32 senses that the sulfur level is above the predetermined level. These sensors will also insure that only the required amount of fuel product is delivered to the underground storage tanks 4, or any utilized aboveground storage tank.

Although various embodiments of the invention have been shown and described, they are not meant to be limiting, those of skill in the art may recognize various modifications to the embodiments of the present invention, which modifications are meant to be covered by the spirit and scope of the appended claims.

What is claimed is:

1. A motorized vehicle service station comprising:
   a plurality of service islands for dispensing a plurality of different fuels to vehicles, said fuels including multiple grades of gasoline, multiple grades of diesel, and blends thereof;
   a vehicle wireless communicator in a vehicle entering said station for transmitting signals indicative of the vehicle's fuel requirements;
   a station wireless communicator for receiving signals from the vehicle wireless communicator, and responding thereto by sending signals back to said vehicle to direct the vehicle to a service island capable of servicing the vehicle; and
   said plurality of service islands each including a service wireless communicator for responding to signals from the vehicle wireless communicator of a vehicle directed thereto, respectively, for restricting fuel delivery to the vehicle based upon its detected fuel requirements.

2. A motorized vehicle service station comprising:
   a plurality of service islands for servicing vehicles requiring a plurality of different fuels, said fuels including multiple grades of gasoline, multiple grades of diesel, blends thereof, and/or hydrogen, and/or electric recharging;
   a vehicle wireless communicator in a vehicle entering said station for transmitting signals indicative of a vehicle's servicing requirements;
   a station wireless communicator for receiving signals from the vehicle wireless communicator, and responding thereto by sending signals back to said vehicle to direct the vehicle to a service island capable of servicing the vehicle; and
   said plurality of service islands each including a service wireless communicator for responding to signals from the vehicle wireless communicator of a vehicle directed thereto, respectively, for restricting fuel or electric recharging delivery to the vehicle based upon its detected fuel or electric recharging requirements.

3. A motorized vehicle service station comprising:
   a plurality of service islands each being configured to service particular types of motorized vehicles, including:
     at least one first island including at least a first liquid fuel blending pump, for refueling gasoline, diesel, and hydrogen powered vehicles, whereby said hydrogen powered vehicles include an onboard reformer for converting gasoline to hydrogen;
     at least one second island including a hydrogen dispensing system for refueling hydrogen powered vehicles that do not include an onboard reformer;
     at least one third island including an electric battery recharging system for recharging the batteries of electric driven vehicles; and
   a plurality of underground storage tanks for containing liquid fuel components, said tanks being individually connected to said at least a first liquid fuel blending pump or pumps;
   a vehicle wireless communicator being installed in individual vehicles, including activation means for permitting a vehicle operator to turn on the vehicle communicator when entering said service station to transmit signals coded to provide vehicle related information including the type of fuel required by the vehicle, and/or electric recharging requirements, the vehicle's driving condition, maintenance record, and inspection information;
   a station wireless communicator for communicating with a vehicle wireless communicator as it enters a service station, for directing the associated vehicle to one of said plurality of service islands capable of servicing the vehicle; and
   a plurality of service island wireless communicators each being dedicated to an individual one of said plurality of service islands, for receiving signals from a vehicle wireless communicator and responding thereto by configuring the associated service island to service the vehicle, by signaling to the vehicle wireless communicator that the associated service island is ready to service the vehicle or that the island operation has been terminated and cannot service the vehicle, and that if applicable the vehicle requires maintenance and/or inspection based upon information received from the vehicle's wireless communicator.

4. The service station of claim 3, further including:
   an additive tank for containing an additive component required in liquid fuels for powering certain vehicles, said additive tank being connected to said at least a first liquid fuel blending pump.

5. The service station of claim 3, further including:
   a sulfur sensor for sensing the sulfur content of a fuel component as it is being transferred from a tank truck to one of said plurality of underground storage tanks, said sulfur sensor including means for terminating the fuel component transfer if the sulfur content thereof exceeds a predetermined level.

6. The service station of claim 3, further including:
   a convenience store (C-Store) for providing vehicle occupants with an opportunity to purchase food, drinks, and various other items;
   said station wireless communicator being programmed for transmitting offerings of said C-Store to said vehicle wireless communicator, for the information of occupants of said vehicle, for receiving orders from said occupants via said vehicle wireless communicator, for transferring the orders to the C-Store.

7. The service station of claim 3, wherein said first liquid fuel blending pump includes a sulfur trap for removing sulfur from selected fuel types to be dispensed.

8. The service station of claim 7, further including:

an inventory control system for automatically reordering liquid fuel components, and/or additives, and/or hydrogen, and/or C-Store items, whenever the respective inventory available thereof reduces to a predetermined level.

9. The service station of claim 3, further including each one of said plurality of wireless communicators associated with a first island being programmed to provide the fuel type of a vehicle at the associated island to a controller of the associated first liquid fuel blending pump for programming the blender to blend the fuel components and any necessary additive as required by the type for the associated vehicle.

10. The service station of claim 4, wherein said plurality of underground storage tanks include:

a first tank containing fuel of 50 to 90 RON with up to 40 ppm S;

a second tank containing fuel of greater than 100 RON with zero S content;

a third tank containing diesel fuel of greater than 40 CN; and said first through third tanks each being individually connected to said at least a first liquid fuel blending pump, for providing different blended fuels including 87 RON regular grade gasoline with additive, 92 RON super grade gasoline with additive, greater than 100 RON gasoline with 50 to 90 RON gasoline for a dual fuel, greater than 100 RON gasoline with ultra low sulfur for fuel cell driven vehicles having an onboard reformer, greater than 40 CN diesel for standard compression ignition engines, and 50 to 90 RON gasoline with greater than 40 CN diesel without additive for HCCI engines.

11. The service station of claim 4, wherein said plurality of underground storage tanks include:

a first tank containing diesel fuel of 20 to 40 CN;

a second tank containing low sulfur content diesel fuel of 40 to 55 CN with less than 10 ppm S; and a third tank containing gasoline of 87 RON with zero sulfur content;

said first through third tanks each being individually connected to said at least a first liquid fuel blending pump, for providing different blended fuels including 87RON unleaded gasoline with additive, 87 RON gasoline with no sulfur content for fuel cell driven vehicles having onboard reformers, 20 to 40 CN diesel fuel for standard compression ignition engines, and low octane 87 RON gasoline blended with 40 to 55 CN diesel without additive for HCCI engines.

12. The service station of claim 4, wherein said plurality of underground storage tanks include:

a first tank containing diesel fuel of less than 30 CN;

a second tank containing diesel fuel of greater than 50 CN with less than 10 ppm S;

a third tank containing gasoline of greater than 100 RON with zero sulfur content;

a fourth tank containing gasoline having an RON ranging from 50 to 90, with 40 ppm S; and said first through fourth tanks each being individually connected to said at least a first liquid fuel lending pump, for providing different blended fuels including regular gasoline of 87 RON with additive, super gasoline of 92 RON with additive, a dual fuel of greater than 100 RON gasoline blended with less than 50 to 90 RON gasoline, greater than 100 RON with zero content sulfur for fuel cells, 30 CN diesel fuel for standard compression ignition engines, and for HCCI engines a blend of low octane 50 to 90 RON gasoline with 50 CN low sulfur diesel and no additive.

13. The service station of claim 4, wherein said plurality of underground storage tanks include:

a first tank containing fuel of 50 to 90 RON with up to 40 ppm S;

a second tank containing fuel of greater than 100 RON with zero S content;

a third tank containing diesel fuel of greater than 40 CN;

a fourth tank containing an additive;

said first through fourth tanks each being individually connected to said at least a first liquid fuel blending pump, for providing different blended fuels including 87 RON regular grade gasoline with additive, 92 RON super grade gasoline with additive, greater than 00 RON gasoline with 50 to 90 RON gasoline for a dual fuel, greater than 100 RON gasoline with ultra low sulfur for fuel cell driven vehicles having an onboard reformer, greater than 40 CN diesel for standard compression ignition engines, and 50 to 90 RON gasoline with greater than 40 CN diesel without additive for HCCI engines;

a fifth tank containing diesel fuel of 20 to 40 CN;

a sixth tank containing low sulfur content diesel fuel of 40 to 55 CN with less than 10 ppm 5; and a seventh tank containing gasoline of 87 RON with zero sulfur content;

said fourth through seventh tanks each being individually connected to another first liquid fuel blending pump, for providing different blended fuels including 87 RON unleaded gasoline with additive, 87 RON gasoline with no sulfur content for fuel cell driven vehicles having onboard reformers, 20 to 40

CN diesel fuel for standard compression ignition engines, and low octane 87 RON gasoline blended with 40 to 55 CN diesel without additive for HCCI engines;

an eighth tank containing diesel fuel of less than 30 CN;

a ninth tank containing diesel fuel of greater than 50 CN with less than 10 ppm S;

a tenth tank containing gasoline of greater than 100 RON with zero sulfur content;

an eleventh tank containing gasoline having an RON ranging from 50 to 90, with 40 ppm S; and said eighth through eleventh and fourth tanks each being individually connected to yet another first liquid fuel blending pump, for providing different blended fuels including regular gasoline of 87 RON with additive, super gasoline of 92 RON with additive, a dual fuel of greater than 100 RON gasoline blended with less than 80 RON gasoline, greater than 100 RON with zero content sulfur for fuel cells, 30 CN diesel fuel for standard compression ignition engines, and for HCCI engines a blend of low octane 50 to 90 RON gasoline with 50 CN low sulfur diesel and no additive.

14. The service station of claim 3, wherein said at least a first liquid fuel blending pump includes:

an octane sensor system for terminating operation of said pump if the octane level of fuel being dispensed is below that required for a vehicle being refueled.

15. The service station of claim 3, wherein said at least a first liquid fuel blending pump includes:

a sulfur sensor for terminating operation of said pump if the sulfur level of fuel being dispensed exceeds a predetermined maximum level for the fuel type required by the vehicle being refueled.

16. A method for providing a motorized vehicle service station for servicing vehicles of multiple vehicle technologies, comprising the steps of:

installing a plurality of service islands each being configured to service particular types of motorized vehicles, including:

configuring at least one first island to include at least a first liquid fuel blending pump, for refueling gasoline, diesel, and hydrogen powered vehicles, whereby said hydrogen powered vehicles include an onboard reformer for converting gasoline to hydrogen;

configuring at least one second island to include a hydrogen dispensing system for refueling hydrogen powered vehicles that do not include an onboard reformer;

configuring at least one third island to include an electric battery recharging system for recharging the batteries of electric driven vehicles;

installing a plurality of underground storage tanks for individually containing different liquid fuel components, respectively; connecting individually said plurality of underground storage tanks to said at least a first liquid fuel blending pump or pumps;

installing a vehicle wireless communicator in individual vehicles, including activation means for permitting a vehicle operator to turn on the vehicle communicator when entering said service station to transmit signals coded to provide vehicle related information including the type of fuel required by the vehicle, and/or electric recharging requirements, the vehicle's driving condition, maintenance record, and inspection information;

installing in said station a station wireless communicator for communicating with a vehicle wireless communicator as it enters a service station, for directing the associated vehicle to one of said plurality of service islands capable of servicing the vehicle; and installing a service island wireless communicator in each individual one of said plurality of service islands, for receiving signals from a vehicle wireless communicator and responding thereto by configuring the associated service island to service the vehicle associated therewith, by signaling to the vehicle wireless communicator that the associated service island is ready to service the vehicle or that the island operation has been terminated and cannot service the vehicle, and that if applicable the vehicle requires maintenance and/or inspection based upon information received from the vehicle's wireless communicator.

17. The method of claim 16, wherein said step of installing a plurality of underground storage tanks for individually containing different liquid fuel components, respectively, further includes for servicing the refueling requirements of internal combustion engine driven vehicles including HCCI, turbo charged high compression ratio gasoline engines, and dual fuel engines requiring blends of gasoline and diesel, the steps of:

filling a first tank to contain fuel of 50 to 90 RON with up to 40 ppm S;

filling a second tank to contain fuel of greater than 100 RON with zero S content;

filling a third tank to contain diesel fuel of greater than 40 CN;

filling a fourth tank to contain an additive component required in liquid fuels for powering certain vehicles; and operating said at least one first service island to provide different blended fuels to meet the fuel requirements of vehicles being serviced, respectively, said blended fuels including 87 RON regular grade gasoline with additive, 92 RON super grade gasoline with additive, greater than 100 RON gasoline with 50 to 90 RON gasoline for a dual fuel, greater than 100 RON gasoline with ultra low sulfur for fuel cell driven vehicles having an onboard reformer, greater than 40 CN diesel for standard compression ignition engines, 50 to 90 RON gasoline with greater than 40 CN diesel without additive for HCCI engines, and fuel blends with additive where required.

18. The method of claim 16, wherein said step of installing a plurality of underground storage tanks for individually containing different liquid fuel components, respectively, further includes for servicing the refueling requirements of internal combustion engine driven vehicles including HCCI, turbo charged high compression ratio gasoline engines, and dual fuel engines requiring blends of gasoline and diesel, the steps of:

filling a first tank to contain diesel fuel of 20 to 40 CN;

filling a second tank to contain low sulfur content diesel fuel of 40 to 55 CN with less than 10 ppm S;

filling a third tank to contain gasoline of 87 RON with zero sulfur content;

filling a fourth tank to contain an additive component required in liquid fuels for powering certain vehicles; and operating said at least one first service island to provide different blended fuels to meet the fuel requirements of vehicles being serviced, respectively, said blended fuels including 87 RON unleaded gasoline with additive, 87 RON gasoline with no sulfur content for fuel cell driven vehicles having onboard reformers, 20 to 40 CN diesel fuel for standard compression ignition engines, and low octane 87 RON gasoline blended with 40 to 55 CN diesel without additive for HCCI engines.

19. The method of claim 16, wherein said step of installing a plurality of underground storage tanks for individually containing different liquid fuel components, respectively, further includes for servicing the refueling requirements of internal combustion engine driven vehicles including HCCI, turbo charged high compression ratio gasoline engines, and dual fuel engines requiring blends of gasoline and diesel, the steps of:

filling a first tank to contain diesel fuel of less than 30 CN;

filling a second tank to contain diesel fuel of greater than 50 CN with less than 40 ppm S;

filling a third tank to contain gasoline of greater than 100 RON with zero sulfur content;

filling a fourth tank to contain gasoline having an RON ranging from 50 to 90, with 40 ppm S;

filling a fifth tank to contain an additive compound required in liquid fuels for powering certain vehicles; and operating said at least one first service island to provide different blended fuels to meet the fuel requirements of vehicles being serviced, respectively, said blended fuels including regular gasoline of 87 RON with additive, super gasoline of 92 RON with additive, a dual fuel of greater than 100 RON gasoline blended with less than 50 to 90 RON gasoline, greater than 100 RON with zero content sulfur for fuel cells, 30 CN diesel fuel for standard compression ignition engines, and for HCCI engines a blend of low octane 50 to 90 RON gasoline with 50 CN low sulfur diesel and no additive.

20. The method of claim 16, wherein said step of installing a plurality of underground storage tanks for individually containing different liquid fuel components, respectively, further includes for servicing the refueling requirements of internal combustion engine driven vehicles including HCCI, turbo charged high compression ratio gasoline engines, and dual fuel engines requiring blends of gasoline and diesel, the steps of:

filling a first tank to contain fuel of 50 to 90 RON with up to 40 ppm S;

filling a second tank to contain fuel of greater than 100 RON with zero S content;

filling a third tank to contain diesel fuel of greater than 40 CN;

filling a fourth tank to contain an additive compound required in liquid fuels for powering certain vehicles; and operating said at least one first service island to provide different blended fuels to meet the fuel requirements of vehicles being serviced, respectively, said blended fuels including 87 RON regular grade gasoline with additive, 92 RON super grade gasoline with additive, greater than 100 RON gasoline with 50 to 90 RON gasoline for a dual fuel, greater than 100 RON gasoline with ultra low sulfur for fuel cell driven vehicles having an onboard reformer, greater than 40 CN diesel for standard compression ignition engines, and 50 to 90 RON gasoline with greater than 40 CN diesel without additive for HCCI engines;

filling a fifth tank to contain diesel fuel of 20 to 40 CN;

filling a sixth tank to contain low sulfur content diesel fuel of 40 to 55 CN with less than 10 ppm S; and filling a seventh tank to contain gasoline of 87 RON with zero sulfur content;

said fourth through seventh tanks each being individually connected to at least a fourth service island to provide different blended fuels including 87 RON unleaded gasoline with additive, 87 RON gasoline with no sulfur content for fuel cell driven vehicles having onboard reformers, 20 to 40 CN diesel fuel for standard compression ignition engines, and low octane 87 RON gasoline blended with 40 to 55 CN diesel without additive for HCCI engines;

filling an eighth tank to contain diesel fuel of less than 30 CN;

filling a ninth tank to contain diesel fuel of greater than 50 CN with less than 10 ppm S;

filling a tenth tank to contain gasoline of greater than 100 RON with zero sulfur content;

filling an eleventh tank to contain gasoline having an RON ranging from 50 to 90, with 40 ppm S; and said seventh through eleventh and fourth tanks each being individually connected to at least a fifth service island to provide different blended fuels including regular gasoline of 87 RON with additive, super gasoline of 92 RON with additive, a dual fuel of greater than 100 RON gasoline blended with less than 80 RON gasoline, greater than 100 RON with zero content sulfur for fuel cells, 30 CN diesel fuel for standard compression ignition engines, and for HCCI engines a blend of low octane 50 to 90 RON gasoline with 50 CN low sulfur diesel and no additive.

* * * * *